UNITED STATES PATENT OFFICE.

THOMAS ROUSE, OF STAMFORD HILL, LONDON, ENGLAND, ASSIGNOR OF ONE-HALF TO BESSLER WAECHTER & COMPANY, LIMITED, OF LONDON, ENGLAND.

PROCESS OF PRODUCING A FERRATED AND BORATED ALKALINE SILICATE.

1,109,704.   Specification of Letters Patent.   Patented Sept. 8, 1914.

No Drawing.   Application filed February 9, 1911.   Serial No. 607,580.

*To all whom it may concern:*

Be it known that I, THOMAS ROUSE, British subject, residing at "The Poplars," 6 West Bank, Stamford Hill, London, N., England, have invented the new and useful Improved Process of Producing a Ferrated and Borated Alkaline Silicate, of which the following is a specification.

As is well known, alkaline silicates, such as silicate of potash and silicate of soda, forming what is known as soluble water glass, and mixtures of these alkaline silicates, have long been used as a binding agent in the manufacture of artificial stone for various uses; in the briqueting of powdered fuel, ores, metalliferous bodies and the like and in the production of paints, varnishes and other bodies. The alkaline silicate, when in the form of a solution, is however an unpleasant substance to handle and owing to its bulk and weight, expensive to transport. If, to avoid these objections it be concentrated to 180° Twaddell, it forms a sticky deliquescent stiff pasty mass. If the alkaline silicate be produced by fusing silica with an alkali at a high temperature, it forms a hard glass like mass that can only be dissolved under pressures.

Now the object of the present invention is to produce a substance consisting mainly of alkaline silicate that is suitable for various purposes like ordinary alkaline silicates but which, while possessing the advantages of such alkaline silicates, shall be in a solid state, can be easily powdered, shall not become deliquescent or sticky, can be readily dissolved in hot water without the aid of pressure and which can be more economically used than ordinary alkaline silicates.

I have found that soluble silicious material consisting mainly of alkaline silicate and possessing all the above mentioned desirable advantages over ordinary alkaline silicates can be obtained by incorporating or combining with an alkaline silicate, or mixture of alkaline silicates, of the kind herein referred to, or with the substances, such as silica and an alkali used for making such an alkaline silicate, a small percentage of oxid of iron and a small percentage of calcined borax and heating the mixture to such a temperature and for such a time that the product will solidify on cooling, or, it may be, to render the product anhydrous. It is important that the borax should not be used in the crystallized state, but in the dry amorphous condition produced by calcining crystallized borax.

In carrying out the invention, a soluble alkaline silicate according to the invention and which for distinction I term ferrated and borated alkaline silicate, is produced by heating a mass of alkaline silicious material and water with a small percentage of ferric oxid, say about one per cent. of ferric oxid ($Fe_2O_3$) and a small percentage, say about one half of one per cent., of calcined borax, the ferric oxid and calcined borax being thoroughly mixed or incorporated with the alkaline silicate and continuing the heating and the evaporation of the water until the mass, on cooling, will solidify. The ferric oxid and calcined borax can be added to the alkaline silicious material and water at any desired or convenient stage of the process without affecting the action that takes place or the product obtained. Thus, they may be added to a mixture of the substances ordinarily used for making soluble alkaline silicate, for example silica and caustic potash or caustic soda or their equivalents, or a mixture of these alkalies or their equivalent, containing water, before heating these substances or they may be added, preferably in the order mentioned, to and thoroughly incorporated with the aqueous alkaline silicious mass while the same is being heated and is in a more or less liquid condition; or they may be added to and thoroughly incorporated with an aqueous solution of the alkaline silicate or silicates while the latter is in a cold or heated condition, the mixture of the alkaline silicate, water, ferric oxid and calcined borax being in each case heated or boiled until the water present is evaporated to such a degree that the mass will solidify on cooling. The finished material in each case is of a red color similar to that of coral. In each case the ferric oxid acts to facilitate the admixture and combination of the borax with the alkaline silicate. In each case there is obtained alkaline silicious material of a dry and non-deliquescent character, that contains a very high percentage of alkaline silicate, is capable of being readily reduced to powder, is of a red color, is insoluble in cold water, but readily soluble in hot water at ordinary atmospheric pressure, and one part of which can be dissolved in about three times its weight of water without separation of silicious or other matter, to form a solution that can readily and advantageously be used as a binding medium in briqueting fuel, ores and other substances and for various other useful purposes. For briqueting coke dust, an addition thereto of about 6% of a solution of one part by weight of the new alkaline silicious material—ferrated and borated alkaline silicate—in about three parts by weight of water, yielding a solution of about 48° Twaddell, will suffice to produce briquets of a hard non-deliquescent character, not liable to become wet and sticky, or to disintegrate by exposure to moist air, and containing only a very small amount of inorganic matter due to the silicious binding medium used. For briqueting small coal and other finely divided materials that are not of so porous a character as coke, a smaller percentage of the said solution will suffice. In the production of the new material according to this invention, the heating may be carried to such a degree that the product finally obtained is anhydrous. In this case the product will be of a light porous or cellular character and of a pink color.

It is to be understood that the invention is not limited to the use of the particular percentages of ferric oxid and calcined borax mentioned by way of example as giving good results, as such percentages may be varied, but in any case they need only be very small.

What I claim is:—

1. A process for the production of a solid soluble alkaline silicate, herein termed ferrated and borated alkaline silicate, which consists in heating alkaline silicious material and water with relatively small quantities of ferric oxid and calcined borax that are thoroughly incorporated therewith and continuing the heating of the mass until such time that the ferrated and borated alkaline silicate obtained will solidify on cooling.

2. As a new article of manufacture, soluble alkaline silicious material, herein termed ferrated and borated alkaline silicate, said material being of a dry and non-deliquescent character and capable of being readily powdered, which contains a very high percentage of alkaline silicate and is insoluble in cold water but readily soluble in hot water at atmospheric pressure.

In testimony whereof I have signed my name to this specification in the presence of two subscribing witnesses.

THOS. ROUSE.

Witnesses:
 BERTIE WILLIAM MAUSER,
 ARTHUR FREDERICH GOLTS.